(12) United States Patent
Kayiran et al.

(10) Patent No.: US 12,079,634 B2
(45) Date of Patent: Sep. 3, 2024

(54) LOOK-AHEAD TELEPORTATION FOR RELIABLE COMPUTATION IN MULTI-SIMD QUANTUM PROCESSOR

(71) Applicant: Advanced Micro Devices, Inc., Santa Clara, CA (US)

(72) Inventors: Onur Kayiran, Santa Clara, CA (US); Jieming Yin, Bellevue, WA (US); Yasuko Eckert, Bellevue, WA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 593 days.

(21) Appl. No.: 16/794,124

(22) Filed: Feb. 18, 2020

(65) Prior Publication Data
US 2021/0255871 A1 Aug. 19, 2021

(51) Int. Cl.
*G06F 9/38* (2018.01)
*G06F 8/41* (2018.01)
*G06N 10/00* (2022.01)

(52) U.S. Cl.
CPC .............. *G06F 9/3887* (2013.01); *G06F 8/41* (2013.01); *G06N 10/00* (2019.01)

(58) Field of Classification Search
None
See application file for complete search history.

(56) References Cited

U.S. PATENT DOCUMENTS

| | | | | |
|---|---|---|---|---|
| 5,754,871 A | * | 5/1998 | Wilkinson | G06F 15/8007 712/E9.055 |
| 5,878,241 A | * | 3/1999 | Wilkinson | G06F 9/3887 712/E9.055 |
| 10,289,816 B1 | * | 5/2019 | Malassenet | G06F 21/14 |
| 11,301,547 B1 | * | 4/2022 | Malassenet | G06F 21/14 |
| 11,455,563 B2 | * | 9/2022 | Shehab | G06N 10/00 |
| 11,514,209 B1 | * | 11/2022 | Fernandes Ramos | G06N 10/80 |
| 2008/0185576 A1 | * | 8/2008 | Hollenberg | G06N 10/00 257/14 |

(Continued)

FOREIGN PATENT DOCUMENTS

KR 1020060135104 A 12/2006

OTHER PUBLICATIONS

"Compiler Management of Communication and Parallelism for Quantum Computation", Heckey et al., obtained via IDS Filed Feb. 18, 2020, pp. 1-10.*

(Continued)

*Primary Examiner* — Henry Tsai
*Assistant Examiner* — Christopher A Bartels
(74) *Attorney, Agent, or Firm* — Volpe Koenig

(57) ABSTRACT

A technique for processing qubits in a quantum computing device is provided. The technique includes determining that, in a first cycle, a first quantum processing region is to perform a first quantum operation that does not use a qubit that is stored in the first quantum processing region, identifying a second quantum processing region that is to perform a second quantum operation at a second cycle that is later than the first cycle, wherein the second quantum operation uses the qubit, determining that between the first cycle and the second cycle, no quantum operations are performed in the second quantum processing region, and moving the qubit from the first quantum processing region to the second quantum processing region.

21 Claims, 5 Drawing Sheets

(56) References Cited

U.S. PATENT DOCUMENTS

| | | | | |
|---|---|---|---|---|
| 2013/0308956 | A1* | 11/2013 | Meyers | B82Y 10/00 977/933 |
| 2016/0191173 | A1* | 6/2016 | Malaney | H04L 9/0852 455/899 |
| 2018/0052806 | A1* | 2/2018 | Hastings | G06N 10/00 |
| 2019/0042677 | A1* | 2/2019 | Matsuura | G06N 10/20 |
| 2019/0042974 | A1* | 2/2019 | Daraeizadeh | G06N 7/01 |
| 2020/0192417 | A1* | 6/2020 | Fernandes Ramos | H03L 7/08 |
| 2021/0342730 | A1* | 11/2021 | Redmond | G06N 10/40 |
| 2021/0398621 | A1* | 12/2021 | Stojevic | G16C 20/30 |
| 2022/0036243 | A1* | 2/2022 | Das | G06F 17/16 |
| 2023/0206104 | A1* | 6/2023 | Rab | G06N 10/40 716/100 |

OTHER PUBLICATIONS

Heckey, J., et. al., "Compiler Management of Communication and Parallelism for Quantum Computation", 12 pgs., Mar. 2015 (downloaded from https://people.cs.uchicago.edu/~ftchong/papers/ASPLOS-15-QC.pdf).

Metodi, T. S., et. al. "Quantum Computing for Computer Architects, Second Edition", Synthesis Lectures on Computer Architecture #13, Morgan & Claypool Publishers, 2011.

Risque, R., & Jog, A. "Characterization of Quantum Workloads on SIMD Architectures", IEEE International Symposium on Workload Characterization, IEEE, 9 pgs., 2016.

Collins, G. P., "Computing with Quantum Knots", Scientific American 294(4), pp. 56-63, Apr. 2006.

Tannu, S. S. & Qureshi, M. K., "A Case for Variability Aware Policies for NISQ-Era Quantum Computers", arXiv, arXIV: 1805.10224, 12 pgs., May 25, 2018.

Finigan, W., et. al., "Qubit Allocation for Noisy Intermediate-Scale Quantum Computers", arXiv, arXiv: 1810.08291, 6 pgs., Oct. 18, 2018.

Li, G., et. al. "Tackling the Qubit Mapping Problem for NISQ-Era Quantum Devices", arXiv, arXiv: 1809.02573, 13 pgs., Sep. 7, 2018.

Siraichi, M. Y., et. al., "Qubit Allocation" Proceedings of the 2018 International Symposium on Code Generation and Optimization, ACM, pp. 113-125, Feb. 2018.

\* cited by examiner

| Cycle | Qubits in global memory | SIMD Region 1 | SIMD Region 2 | Number of qubits moved |
|---|---|---|---|---|
| 1 | a2 | H(a0) | T†(a1) | 2 |
| 2 |  | T(a2), T(a0) | a1 | 1 |
| 3 | a0 | CNOT(a2, a1) |  | 2 |
| 4 | a2 | CNOT(a1, a0) |  | 2 |
| 5 |  | T†(a1) | CNOT(a0, a2) | 2 |
| 6 |  | CNOT(a1, a2) | T(a0) | 1 |
| 7 |  | T†(a1), T†(a2) | a0 | 0 |
| 8 | a2 | CNOT(a1, a0) |  | 2 |
| 9 |  | S(a1) | CNOT(a0, a2) | 2 |
| 10 |  | H(a0) | CNOT(a2, a1) | 2 |
|  |  |  |  | Total: 16 |

FIG. 3

| Cycle | Qubits in global memory | SIMD Region 1 | SIMD Region 2 | Number of qubits moved |
|---|---|---|---|---|
| 1 | a2 | H(a0) | T†(a1) | 2 |
| 2 | a0 | T(a2), T(a0) | a1 | 1 |
| 3 | | CNOT(a2, a1) | | 2 |
| 4 | | CNOT(a1, a0) | a2 | 2 |
| 5 | | T†(a1) | CNOT(a0, a2) | 1 |
| 6 | | CNOT(a1, a2) | T(a0) | 1 |
| 7 | | T†(a1), T†(a2) | a0 | 0 |
| 8 | | CNOT(a1, a0) | a2 | 2 |
| 9 | | S(a1) | CNOT(a0, a2) | 1 |
| 10 | | H(a0) | CNOT(a2, a1) | 2 |
| | | | | Total: 14 |

LOOK-AHEAD TELEPORTATION FOR RELIABLE COMPUTATION IN MULTI-SIMD QUANTUM PROCESSOR

BACKGROUND

Quantum computers take advantage of certain quantum features of matter to perform calculations that would take classical computers an exceedingly high amount of time. The potential of quantum computing is great, and developments are frequently being made.

BRIEF DESCRIPTION OF THE DRAWINGS

A more detailed understanding may be had from the following description, given by way of example in conjunction with the accompanying drawings wherein:

FIG. 3 illustrates an example sequence of quantum operations specified by a quantum program as well as the regions that execute the different quantum operations;

FIG. 4 illustrates an example of the above technique for performing fewer qubits moves than the technique of FIG. 3.

DETAILED DESCRIPTION

A method for processing qubits in a quantum computing device is provided. The method includes determining that, in a first cycle, a first quantum processing region is to perform a first quantum operation that does not use a qubit that is stored in the first quantum processing region, identifying a second quantum processing region that is to perform a second quantum operation at a second cycle that is later than the first cycle, wherein the second quantum operation uses the qubit, determining that between the first cycle and the second cycle, no quantum operations are performed in the second quantum processing region, and moving the qubit from the first quantum processing region to the second quantum processing region.

An apparatus is provided. The apparatus includes a first quantum processing region, a second quantum processing region, and a lookahead processor. The lookahead processor is configured to determine that, in a first cycle, the first quantum processing region is to perform a first quantum operation that does not use a qubit that is stored in the first quantum processing region, identify that the second quantum processing region is to perform a second quantum operation at a second cycle that is later than the first cycle, wherein the second quantum operation uses the qubit, determine that between the first cycle and the second cycle, no quantum operations are performed in the second quantum processing region, and cause the qubit to move from the first quantum processing region to the second quantum processing region.

A non-transitory computer-readable medium storing instructions that, when executed by a processor, cause the processor to perform steps is provided. The steps include compiling quantum source code into an intermediate quantum program and performing a set of transformations on the intermediate quantum program to generate a transformed quantum program. The set of transformations include determining that, as specified by the intermediate quantum program, in a first cycle, the first quantum processing region is to perform a first quantum operation that does not use a qubit that is stored in the first quantum processing region, identify that, as specified by the intermediate quantum program, the second quantum processing region is to perform a second quantum operation at a second cycle that is later than the first cycle, wherein the second quantum operation uses the qubit, determine, as specified by the intermediate quantum program, that between the first cycle and the second cycle, no quantum operations are performed in the second quantum processing region, and insert, into the transformed quantum program, an instruction that causes the qubit to move from the first quantum processing region to the second quantum processing region.

Figure 1:
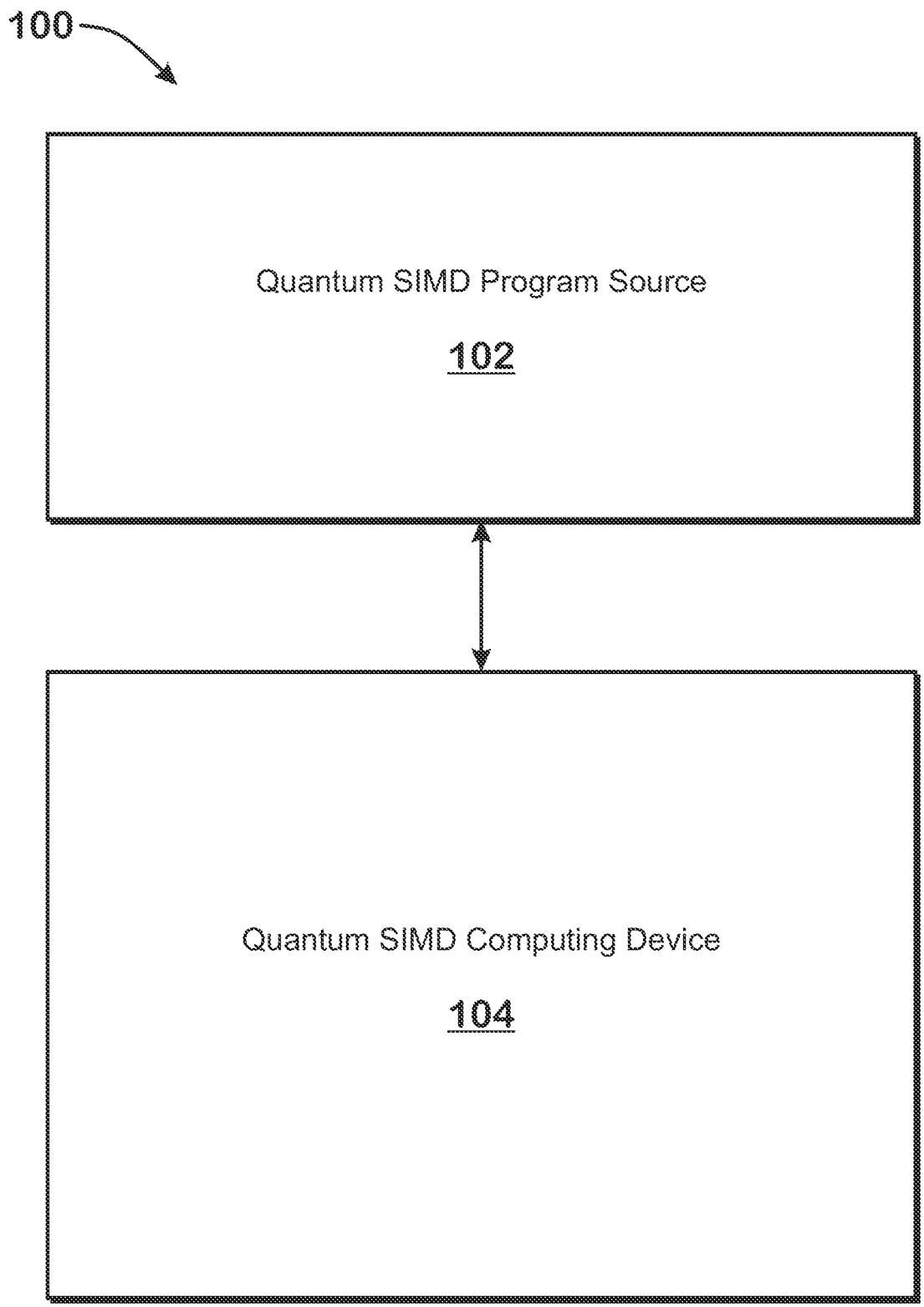
FIG. 1 is a block diagram of a quantum computing system for performing quantum operations, according to an example.

FIG. 1 is a block diagram of a quantum computing system 100 for performing quantum operations, according to an example. The quantum computing system 100 includes a quantum SIMD ("single instruction multiple data") program source 102 and a quantum SIMD computing device 104. The quantum SIMD program source 102 is an entity that provides a quantum SIMD program to the quantum SIMD computing device 104 for execution. The quantum SIMD program source 102 is any device capable of performing this task. In general, the quantum SIMD program 102 is a hardware unit, software unit, or combination thereof. Some examples of the quantum SIMD program source 102 including a traditional computing system (including, for example, a central processing unit, memory, input/output devices, and other items) that stores the quantum SIMD program and provides that program to the quantum SIMD computing device 104 for execution. In some implementations, the quantum SIMD program source 102 includes a compiler that compiles source code into the quantum SIMD program to be transmitted to the quantum SIMD computing device 104 for execution. In some examples, the quantum SIMD program source 102 is a part of the quantum SIMD computing device 104.

Figure 2:
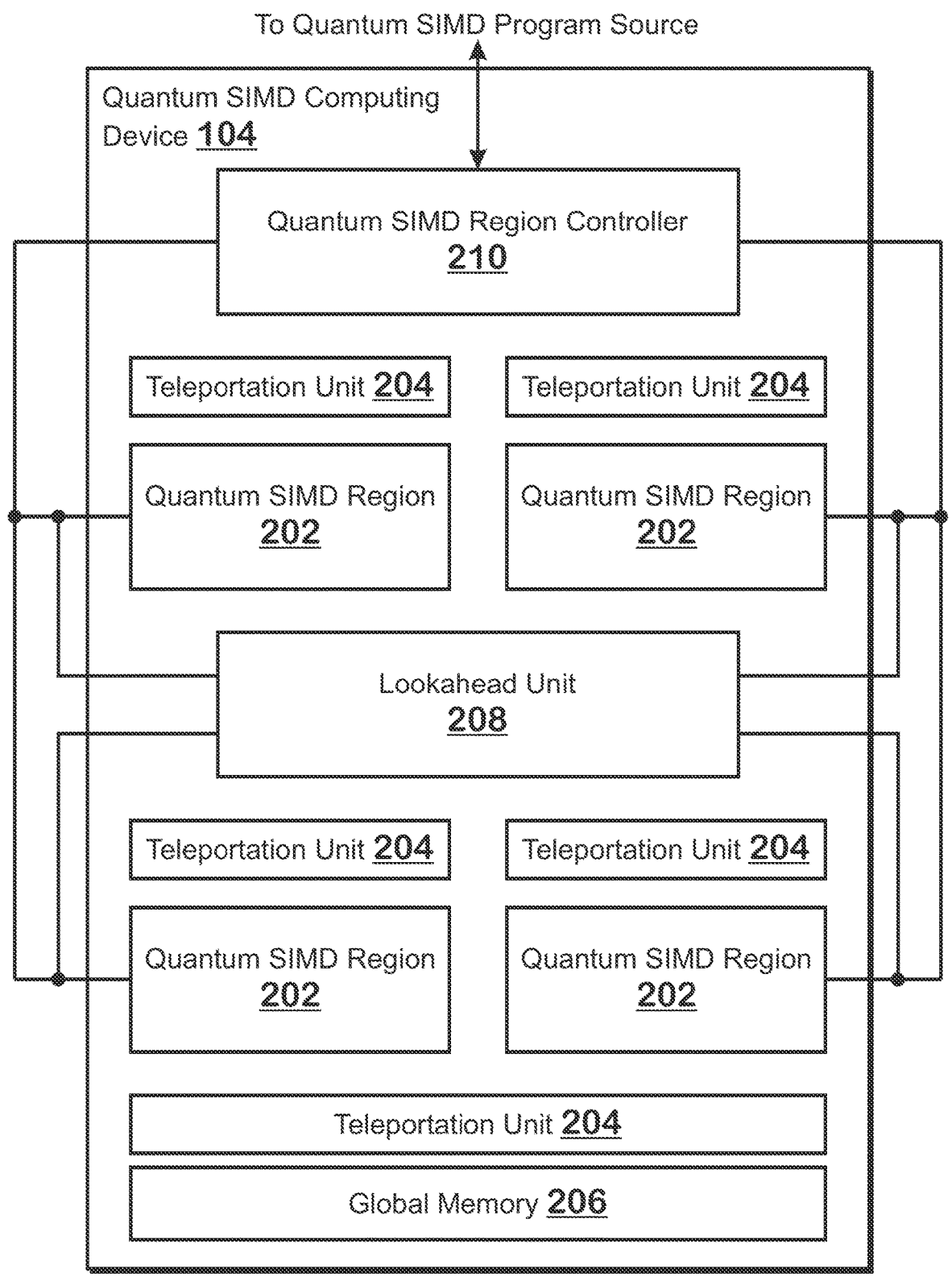
FIG. 2 is a block diagram of the quantum computing device of FIG. 1, according to an example.

FIG. 2 is a block diagram of the quantum SIMD computing device 104, according to an example. The quantum SIMD computing device 104 includes a plurality of quantum SIMD regions 202, each of which is accessible to a teleportation unit 204. Elsewhere herein, quantum SIMD regions 202 are referred to alternatively as "quantum regions," or "quantum processing regions." The quantum SIMD computing device 104 also includes a global memory 206, which is accessible to a teleportation unit 204. The quantum SIMD computing device 104 also includes a lookahead unit 208 and a quantum SIMD region controller 210 coupled to the quantum SIMD program source 102.

The quantum SIMD region controller 210 and the lookahead unit 208 are control circuits that control the operations of the quantum SIMD regions 202, the global memory 206, and the teleportation units 204. In some implementations, there is no lookahead unit 208 and the operations of the lookahead unit are performed by the quantum SIMD region controller 210. Thus, where the present disclosure states that the lookahead unit 208 performs certain actions, in implementations without the lookahead unit 208, the quantum SIMD region controller 210 performs those actions.

The quantum SIMD region controller 210 receives at least a portion of a quantum program from the quantum program source and controls the quantum SIMD regions 202 according to the quantum program. The quantum program specifies a sequence of SIMD operations to perform in each quantum SIMD region 202. More specifically, the quantum program specifies a sequence of computer cycles, where each cycle represents a certain portion of time in which SIMD operations occur. In each computer cycle, the quantum program specifies a quantum operation to be performed at one of the SIMD regions or at each of the quantum SIMD regions 202. Each quantum operation specifies one or more operands, which are quantum bits or qubits. A compiler, in generating the quantum program, schedules quantum operations in different SIMD regions 202 to perform the operations in a manner specified by source code and without conflicts. In some implementations, the compiler resides at the quantum SIMD program source 102 which includes a computer system. In other implementations, the quantum SIMD program source 102 receives a compiled program that is compiled by a computing system outside of the quantum SIMD program source 102.

Each quantum SIMD region 202 is capable of performing one quantum operation on multiple quantum bits in a given period of time (e.g., a cycle). Example quantum operations include the following operations: the Hadamard gate (H-gate); The T-gate; the $T^\dagger$-gate; the controlled Not gate (CNOT-gate); and the S-gate. Although some gates are mentioned herein, the SIMD regions 202 may implement any technically feasible quantum gates. More specifically, the SIMD nature of each region 202 means that in any particular cycle, the quantum operation performed at a particular region 202 is capable of being performed in parallel on multiple different quantum bits. The number of bits on which quantum operations can be performed in the same cycle in a quantum SIMD region is referred to herein as the width of the quantum SIMD region 202. The quantum SIMD regions 202 are considered processors that perform various quantum operations. The quantum operations are sometimes referred to as quantum gates in the quantum circuit model of computation.

Due to the no-cloning theorem, quantum bits cannot be copied. Therefore, to process a particular quantum bit in a particular quantum SIMD region 202, the quantum bit is physically moved through quantum teleportation to the quantum SIMD region 202. A quantum teleportation unit 204 performs this qubit transfer. The physical implementation of the quantum teleportation units 204 depend on the physical implementation of the qubits. Quantum teleportation is a known technique and circuitry for performing quantum teleportation is understood in the art. The quantum teleportation units 204 comprise circuits for performing quantum teleportation of the qubits between SIMD regions 202. In any given cycle, the global memory 206 stores qubits that are not processed by any of the quantum SIMD regions 202. To perform quantum operations, a quantum teleportation unit 204 quantum teleports a qubit from a SIMD region 202 to another SIMD region 202 or from the global memory 206 to a SIMD region 202. The SIMD region 202 then performs the specified quantum operation.

Quantum computing has the characteristic that computations are error prone. Movement of qubits through quantum teleportation increases the degree to which errors occur. Therefore it is beneficial in a quantum computing system to reduce the number of movements of qubits used to perform quantum computations.

In one technique, the quantum SIMD region controller 210 performs qubit movements in the following manner. As described above, the quantum SIMD region controller 210 receives a quantum SIMD program from the quantum SIMD program source 102. The quantum SIMD program includes a listing of per-cycle operations that specifies, for each cycle, which SIMD 202 regions perform which quantum operations on which qubits.

To execute quantum operations in any particular cycle, the quantum SIMD region controller 210 examines the quantum SIMD program, which specifies which qubits are required in each of the quantum SIMD regions 202. The quantum SIMD region controller 210 determines the location of each qubit and causes each such qubit to be teleported to the location specified for the current cycle if such move is necessary. For qubits for which no quantum operation is performed in any quantum SIMD region 202, the quantum SIMD region controller 210 quantum teleports those qubits to the global memory 206 or quantum teleports those qubits to a SIMD region 202 based on analysis of the lookahead unit 208. With the qubits located in the correct respective quantum SIMD regions 202, each quantum SIMD region 202 performs the quantum operation specified by the quantum program for that cycle. It is possible for different quantum SIMD regions 202 to perform different quantum operations in the same cycle.

FIG. 3 illustrates an example sequence of quantum operations specified by a quantum program as well as the regions that execute the different quantum operations. A series of cycles are shown, in which quantum operations in two quantum SIMD regions 202 are illustrated. In addition, the qubits in global memory is illustrated for each cycle. The number of qubits moved to execute the operations of each cycle are also illustrated.

In cycle 1, the quantum SIMD region controller 210 moves qubit a0 into SIMD region 1 and moves qubit a1 into SIMD region 2, meaning that two total qubit moves have occurred in cycle 1. Then, the quantum SIMD region controller 210 causes SIMD region 1 to perform the H( ) quantum operation on qubit a0 and causes SIMD region 2 to perform the $T^\dagger$( ) quantum operation on qubit a1.

In cycle 2, the quantum SIMD region controller 210 moves qubit a2 into SIMD region 1 and causes SIMD region 1 to perform the T( ) operator on qubits a2 and a0. A total of one move occurs in cycle 2. Note, as described elsewhere herein, an individual SIMD region 202 is able to perform multiple instances of the same quantum operation on multiple items of data in a given cycle.

In cycle 3, the quantum SIMD region controller 210 moves qubit a1 from SIMD region 2 to SIMD region 1 and moves qubit a0 to global memory since that qubit is not used in SIMD region 1 in cycle 3. A total of 2 qubit moves occur at cycle 3. Also, SIMD region 1 performs the CNOT quantum operation on qubits a2 and a1.

In cycle 4, the quantum SIMD region controller 210 moves qubit a2 into global memory since that qubit is not used in SIMD region 1 and moves qubit a0 from global memory to SIMD region 1. A total of 2 moves occur at cycle 4. Then SIMD region 1 performs the CNOT quantum operation on qubits a1 and a0.

In cycle 5, the quantum SIMD region controller 210 moves qubit a2 from global memory to SIMD region 2 and moves qubit a0 from SIMD region 1 to SIMD region 2, for a total of 2 moves. Then, SIMD region 1 performs the $T^\dagger$( ) quantum operation on qubit a1 and SIMD region 2 performs the CNOT quantum operation on qubits a0 and a2.

In cycle 6, the quantum SIMD region controller 210 moves qubit a2 from SIMD region 2 to SIMD region 1 for a total of 1 move. Then, SIMD region 1 performs the CNOT quantum operation on qubits a1 and a2 and SIMD region 2 performs the T quantum operation on qubit a0.

In cycle 7, no moves occur because qubit a0 is not needed and qubits a1 and a2 are already in SIMD region 1, which performs the T† operation on those qubits.

In cycle 8, the quantum SIMD region controller 210 moves qubit a2 from SIMD region 1 to global memory and moves qubit a0 from SIMD region 2 to SIMD region 1, for a total of 2 moves. Also, SIMD region 1 performs the CNOT quantum operation on qubits a1 and a0.

In cycle 9, the quantum SIMD region controller 210 moves qubit a0 from SIMD region 1 to SIMD region 2 and moves qubit a2 from global memory to SIMD region 2, for a total of 2 moves. Then, SIMD region 1 performs the S quantum operation on qubit a1 and SIMD region 2 performs the CNOT quantum operation on qubits a0 and a2.

In cycle 10, the quantum SIMD region controller 210 moves qubit a1 from SIMD region 1 to SIMD region 2 and moves qubit a0 from SIMD region 2 to SIMD region 1, for a total of 2 moves. Then, SIMD region 1 performs the H quantum operation on qubit a0 and SIMD region 2 performs the CNOT quantum operation on qubits a1 and a2.

A different technique than that illustrated in FIG. 3 results in even fewer qubit moves, thereby increasing reliability. This improved technique is performed in the following manner. In a cycle, the quantum SIMD region controller 210 identifies the qubits for which quantum operations are to be performed in the SIMD regions 202 of the quantum SIMD computing device 104. The quantum SIMD region controller 210 moves the qubits from the current location of the qubits (other SIMD regions 202 or global memory 206) into the SIMD regions 202 where operations are to be performed on the qubits.

For qubits that are not used in operations in the current cycle, and are to be moved out of a SIMD region 202 the quantum SIMD region controller 210 determines where to move those qubits to. More specifically, for each such qubit, the lookahead unit 208 examines the quantum SIMD program to determine the next cycle that the qubit will be used in a quantum operation in a quantum SIMD region 202. If the quantum SIMD region 202 does not perform any quantum operations in between the current cycle and the next cycle that the qubit will be used in that quantum SIMD region 202, then the lookahead unit 208 moves the qubit to that quantum SIMD region 202. If that quantum SIMD region 202 does perform a quantum operation within that time period, then quantum SIMD region controller 210 moves that qubit to the global memory 206. In other words, the qubit can be moved to the next quantum SIMD region 202 that uses that qubit, instead of the global memory 206, if that quantum SIMD region 202 does not perform a quantum operation that does not use the qubit before that quantum SIMD region 202 does use that qubit.

FIG. 4 illustrates an example of the above technique for performing fewer qubits moves than the technique of FIG. 3. In cycle 1, the quantum SIMD region controller 210 moves qubit a0 into SIMD region 1 and moves qubit a1 into SIMD region 2, meaning that two total qubit moves have occurred in cycle 1. Then, the quantum SIMD region controller 210 causes SIMD region 1 to perform the H( ) quantum operation on qubit a0 and causes SIMD region 2 to perform the T†( ) quantum operation on qubit a1.

In cycle 2, the quantum SIMD region controller 210 moves qubit a2 into SIMD region 1 and causes SIMD region 1 to perform the T0 operator on qubits a2 and a0. A total of one move occurs in cycle 2. Qubit a1 is not moved from SIMD region 2 in this cycle because the next place qubit a1 is used is SIMD region 1, and SIMD region 1 is performing a quantum operation that does not involve qubit a1 in cycle 2.

In cycle 3, the quantum SIMD region controller 210 moves qubit a1 from SIMD region 2 to SIMD region 1 and moves qubit a0 to global memory since that qubit is not used in SIMD region 1 in cycle 3. A total of 2 qubit moves occur at cycle 3. Also, SIMD region 1 performs the CNOT quantum operation on qubits a2 and a1. The next SIMD region that qubit a0 is to be used in is SIMD region 1, but because no operations are performed on qubit a0 in SIMD region 1 in cycle 3, qubit a0 is not kept in SIMD region 1 during cycle 3.

In cycle 4, the quantum SIMD region controller 210 moves qubit a0 from global memory to SIMD region 1, since qubit a0 is used in an operation in SIMD region 1 in cycle 4. Prior to cycle 4, qubit a2 is in SIMD region 1. However, qubit a2 is not used by any quantum operation in cycle 4. However, instead of moving qubit a2 to global memory, the lookahead unit 208 determines that the next SIMD region to use qubit a2 is SIMD region 2 and also determines that from the time that qubit a2 is moved out of SIMD region 1 (cycle 4) to the time that qubit a2 is used in SIMD region 2 (cycle 5), no other operations are performed in SIMD region 2. Therefore, the lookahead unit 208 causes the SIMD region controller 210 to move qubit a2 to SIMD region 2 in cycle 4. Note that the cycle in which qubit a2 is to be used next is not the cycle in which a conflict for qubit a2 is identified. In other words, the cycle in which a2 is determined not to be used in SIMD region 1—cycle 4—is not the cycle in which the subsequent use of qubit a2 (cycle 5) occurs.

In cycle 5, the quantum SIMD region controller 210 causes qubit a0 to move from SIMD region 1 to SIMD region 2, for a total of 1 move. Because qubit a2 is already in SIMD region 2, there are fewer moves in cycle 5 in the example of FIG. 4 than there are in cycle 5 in the example of FIG. 3, since qubit a2 does not need to move from global memory 206 to SIMD region 2.

In cycle 6, the quantum SIMD region controller 210 causes qubit a2 to move from SIMD region 2 to SIMD region 1, for a total of 1 move. Then, SIMD region 1 performs the CNOT quantum operation on qubits a1 and a2 and SIMD region 2 performs the T quantum operation on qubit a0.

In cycle 7, no moves occur because qubit a0 is not needed and qubits a1 and a2 are already in SIMD region 1, which performs the T† operation on those qubits. The quantum SIMD region controller 210 does not move qubit a0 to the global memory 206 because no operations are performed in SIMD region 2 in cycle 7 and thus there is no need to move qubit a0.

In cycle 8, the quantum SIMD region controller moves qubit a0 from SIMD region 2 to SIMD region 1. Qubit a2 is not used in a quantum operation in any SIMD region. Therefore, this qubit is moved from SIMD region 1. The lookahead unit 208 determines that SIMD region 2 is the next SIMD region to have an operation that uses qubit a2 and also determines that no operations are performed at SIMD region 2 from the time qubit a2 is moved from SIMD region 1 to the time that qubit a2 is used by an operation in SIMD region 2. For this reason, the lookahead unit 208 causes the quantum SIMD region controller 210 to move qubit a2 from SIMD region 1 to SIMD region 2. The total number of moves in cycle 8 is 2. In cycle 8, SIMD region 1 performs the CNOT operation with qubits a0 and a1.

In cycle 9, the quantum SIMD region controller 210 moves qubit a0 from SIMD region 1 to SIMD region 2. SIMD region 1 performs the S operation on qubit a1 and SIMD region 2 performs the CNOT operation on qubits a0 and a2. In comparison to FIG. 3, there is one fewer qubit move in cycle 9, since qubit a2 is already in SIMD region 2.

In cycle 10, the quantum SIMD region controller 210 moves qubit a1 from SIMD region 1 to SIMD region 2 and moves qubit a0 from SIMD region 2 to SIMD region 1, for a total of 2 moves. Then, SIMD region 1 performs the H quantum operation on qubit a0 and SIMD region 2 performs the CNOT quantum operation on qubits a1 and a2.

Due to the presence of the lookahead unit 208, the number of qubit moves as compared with the technique of FIG. 3 is reduced. More specifically, in a particular cycle, when the quantum SIMD region controller 210 determines that a qubit is to move from a SIMD region due to that SIMD region performing a quantum operation that does not use that qubit, the SIMD region controller 210 determines if there is a different SIMD region that performs an operation using that qubit in the cycle. If there is no such SIMD region, then the lookahead unit 208 determines if there is a SIMD region that uses the qubit and is idle until that qubit is used. If there is such a SIMD region, then the lookahead unit 208 causes the qubit to be moved to that SIMD region. Without the lookahead unit 208, the qubit would be moved to global memory 206 and would have to be moved to the appropriate SIMD region when the qubit is again needed for an operation. Thus the lookahead unit 208 reduces the number of moves for qubits, thereby increasing the reliability of quantum operations.

In an addition to the technique of FIG. 4 using the lookahead unit 208, the quantum SIMD region controller 210 performs reordering operations to further reduce the number of qubit moves. In an example, the quantum SIMD region controller 210 reorders the quantum operations specified by the quantum program such that two uses of a qubit in a single SIMD region that are at non-consecutive cycles, separated by a cycle where a quantum operation that does not use the qubit, are reordered such that the two uses of the qubit in the single SIMD region are in consecutive cycles and the quantum operation that does not use the qubit is before or after the two uses of the qubit. In an example, in the original, non-reordered program order, the quantum program specifies that SIMD 1 is to perform the CNOT operation on qubits a0 and a1 in cycle 1, then is to perform the H operation on qubit a2 in cycle 2, and then is to perform the T operation on qubit a0 in cycle 3. Thus a1 and a0 would have to be moved out in cycle 2 and moved in in cycle 3. The quantum SIMD region controller 210 instead reorders the operations at cycles 2 and 3, so that qubit a0 does not have to moved out and then back in in cycles 2 and 3.

In performing the reordering, the quantum SIMD region controller 210 does not reorder operations if data dependencies cannot be respected. For example, if a first operation performs an operation on a qubit and a subsequent operation performs another operation on that qubit, then the SIMD region controller 210 does not reorder those two operations such that the subsequent operation is performed before the first operation.

Figure 5:
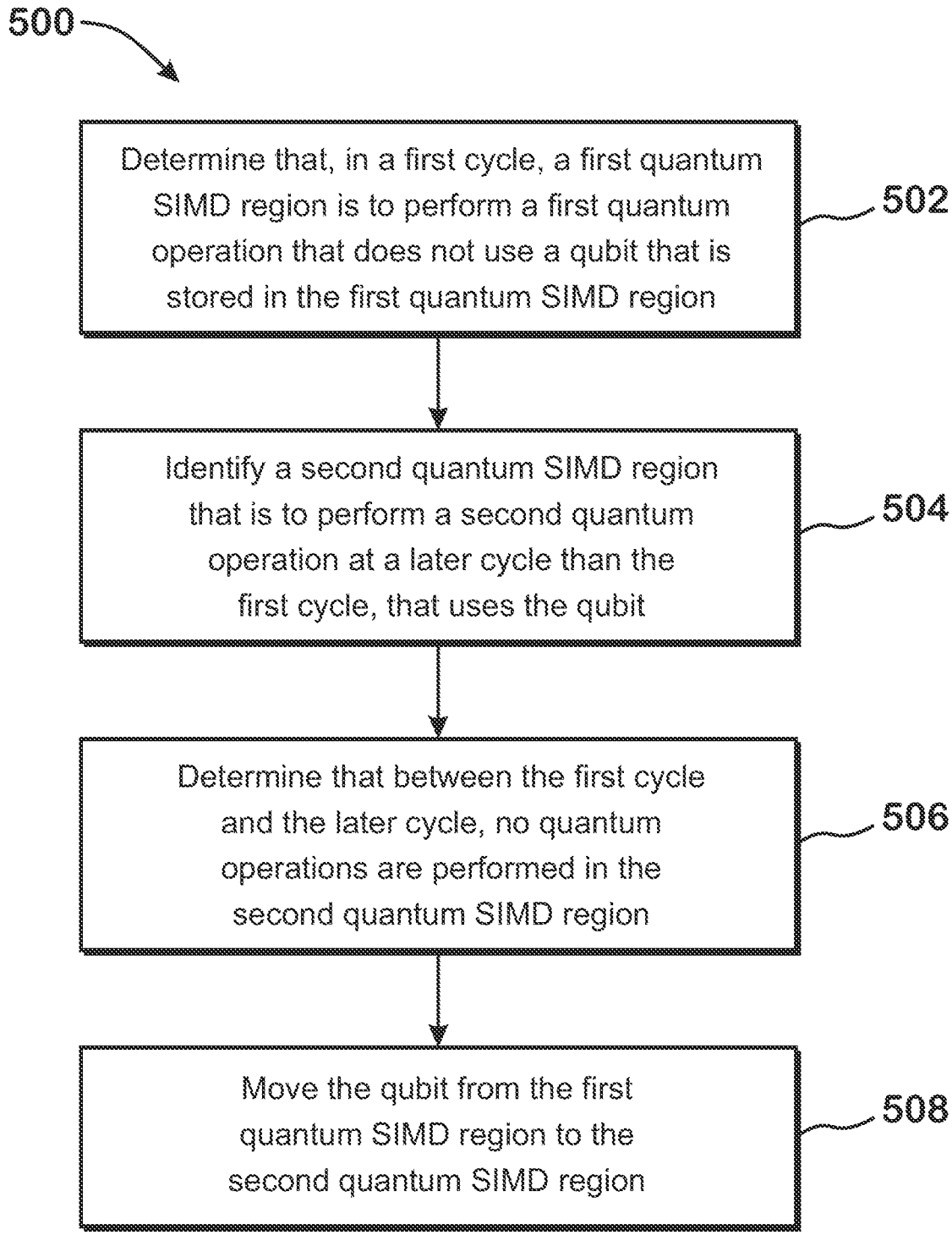
FIG. 5 is a flow diagram of a method for processing qubits in a quantum computing device, according to an example.

FIG. 5 is a flow diagram of a method 500 for processing qubits in a quantum computing device, according to an example. Although described with respect to the system of FIGS. 1-4, those of skill in the art will understand that any system, configured to perform the steps of method 500 in any technically feasible order, falls within the scope of the present disclosure.

At step 502, the quantum SIMD region controller 210 determines that, in a first cycle, a first quantum SIMD region 202 is to perform a first quantum operation that does not use a qubit that is stored in the first quantum SIMD region 202. Because a quantum SIMD region 202 can only perform one type of quantum operation in a given cycle, a qubit is moved from a quantum SIMD region 202 in the cycle that the quantum SIMD region 202 performs a quantum operation that does not operate on that qubit.

At step 504, the lookahead unit 208 identifies a second quantum SIMD region 202 that is to perform a second quantum operation at a later cycle than the first cycle, where the second quantum operation also uses the qubit. The later cycle is not the same cycle as the first cycle. In other words, the cycle in which the qubit is determined to be used by a quantum operation is not the same cycle as the cycle in which the conflict occurs. The conflict is the act of the qubit being in a quantum SIMD region 202 in a cycle in which a quantum operation is to be performed in that quantum SIMD region 202 that does not use the qubit.

At step 506, the lookahead unit 208 determines that between the first cycle and the later cycle, no quantum operations are performed in the second quantum SIMD region 202. "Between the first cycle and the later cycle" means that in the first cycle, and any cycle up to but not including the later cycle. In other words, the phrase is inclusive of the first cycle but is not inclusive of the later cycle. Put another way, at step 506, the lookahead unit 208 determines that the second quantum SIMD region 202 does not perform any quantum operations in the first cycle and in any cycles prior to the later cycle. However, since the qubit is used by the second quantum SIMD region 202 in the later cycle, step 506 does not include determining that the second quantum SIMD region 202 does not perform a quantum operation in the later cycle itself.

At step 508, the quantum SIMD region controller 210 moves the qubit from the first SIMD region 202 to the second quantum SIMD region 202. More specifically, because the qubit is to be used next at the second quantum SIMD region 202, and because there are no operations performed in the second quantum SIMD region 202 between the first cycle and the second cycle, the qubit is "buffered" in the second SIMD region 202. This buffering reduces the number of moves for the qubit as compared with a technique that moves a qubit to the global memory 206 if the qubit is not used in a SIMD region 202 in a particular cycle and the SIMD region 202 performs a quantum operation that does not use the qubit in a cycle after the SIMD region 202 performs a quantum operation that does use the qubit (such as the examples of cycles 4 and 8 for SIMD region 1 in FIG. 3). The quantum SIMD computing device 104 performs the first quantum SIMD operation and the second quantum SIMD operation at appropriate cycles.

Although the method 500 of FIG. 5 illustrates a situation where a qubit is moved from one quantum SIMD region 202 to another quantum SIMD region 202 due to a lookahead operation, there are many situations where a qubit is moved to the global memory 206 because that qubit cannot be buffered in a quantum SIMD region. In one example, a qubit is in SIMD region 1 in a first cycle in which SIMD region 1 performs a quantum operation that does not use the qubit. In the next cycle that the qubit is used, which is not the first cycle, the qubit is used in SIMD region 2. However, between the first cycle and the second cycle, a quantum operation is performed in SIMD region 2 that does not use the qubit. In this situation, the quantum SIMD region controller 210 moves the qubit to global memory because the qubit could not be buffered in SIMD region 2, since SIMD region 2 will perform an operation that does not use the qubit.

It should be understood that many variations are possible based on the disclosure herein. In one example, although it is described that the lookahead unit 208 and quantum SIMD region controller 210 perform the analysis and qubit move operations at runtime, the operations described herein, for analyzing where qubits are used and for moving qubits are, in an alternative implementation, performed by a compiler. More specifically, a compiler performs transforms on a compiled quantum program. The transforms include determining where a qubit is used as specified by the quantum program (e.g, performing steps 502 and 504), determining that a particular SIMD region does not perform a SIMD operation in between the time the qubit is used in a first region and the qubit is used in a second region (e.g., performing step 506), and inserting an instruction into the compiled quantum program to move the qubit from the first region to the second region (e.g., performing step 508). In various implementations, the compiler also performs other operations described herein as being performed by the lookahead unit 208 and/or the quantum SIMD region controller 210. Although features and elements are described above in particular combinations, each feature or element may be used alone without the other features and elements or in various combinations with or without other features and elements.

The various functional units illustrated in the figures and/or described herein (including, where appropriate, the quantum SIMD program source 102, the quantum SIMD computing device 104, the quantum SIMD region controller 210, the quantum SIMD regions 202, the quantum SIMD region controller 210, the lookahead unit 208, and the global memory 206) may be implemented as hardware circuitry, software executing on a programmable processor, or a combination of hardware and software. The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for processing qubits in a quantum computing device, the method comprising:
   moving a first qubit from a first quantum processing region to a second processing region, wherein moving the first qubit is performed in response to: (i) in a first cycle, the first quantum processing operation not using the first qubit; (ii) in a second cycle subsequent to the first cycle, a second quantum processing operation performed in the second processing region using the first qubit; and (iii) between the first cycle and the second cycle, no quantum operations being performed in the second quantum processing region; and
   moving a second qubit from a third quantum processing region to global memory, wherein moving the second qubit is performed in response to: (i) in a third cycle, a second qubit being used by a third quantum operation in a third quantum processing region; (ii) in a fourth cycle later than the third cycle, a fourth quantum operation using the second qubit in a fourth quantum processing region; and (iii) between the third cycle and the fourth cycle, a fifth quantum operation that does not use the second qubit being performed in the fourth quantum processing region.

2. The method of claim 1, wherein the first quantum operation and the second quantum operation are quantum logic gate operations.

3. The method of claim 1, wherein:
   the first quantum operation and the second quantum operation are quantum single instruction multiple data ("SIMD") operations; and
   the first quantum processing region and the second quantum processing regions are SIMD processing regions.

4. The method of claim 3, wherein:
   in a single cycle, the first quantum processing region performs the same quantum logic gate operation on one or more qubits in the first quantum processing region.

5. The method of claim 4, wherein:
   in the single cycle, the first quantum processing region performs a first quantum logic gate operation that is different than a second quantum logic gate operation performed at the second quantum processing region in the single cycle.

6. The method of claim 1, further comprising:
   receiving a quantum program that specifies which quantum processing regions perform which quantum operations in which cycles.

7. The method of claim 6, further comprising:
   compiling source code to generate the quantum program.

8. The method of claim 6, further comprising:
   reordering quantum operations specified by the quantum program to convert non-consecutive uses of a single qubit into consecutive uses of the single qubit.

9. An apparatus, comprising:
   a first quantum processing region;
   a second quantum processing region;
   a third quantum processing region;
   a fourth quantum processing region; and
   a lookahead processor configured to:
      move a first qubit from the first quantum processing region to the second processing region, wherein moving the first qubit is performed in response to: (i) in a first cycle, the first quantum processing operation not using the first qubit; (ii) in a second cycle subsequent to the first cycle, a second quantum processing operation performed in the second processing region using the first qubit; and (iii) between the first cycle and the second cycle, no quantum operations being performed in the second quantum processing region; and move a second qubit from the third quantum processing region to global memory, wherein moving the second qubit is performed in response to: (i) in a third cycle, a second qubit being used by a third quantum operation in a third quantum processing region; (ii) in a fourth cycle later than the third cycle, a fourth quantum operation using the second qubit in the fourth quantum processing region; and (iii) between the third cycle and the fourth cycle, a fifth quantum operation that does not use the second qubit being performed in the fourth quantum processing region.

10. The apparatus of claim 9, wherein the first quantum operation and the second quantum operation are quantum logic gate operations.

11. The apparatus of claim 9, wherein:
the first quantum operation and the second quantum operation are quantum single instruction multiple data ("SIMD") operations; and
the first quantum processing region and the second quantum processing regions are SIMD processing regions.

12. The apparatus of claim 11, wherein:
in a single cycle, the first quantum processing region is configured to perform the same quantum logic gate operation on one or more qubits in the first quantum processing region.

13. The apparatus of claim 12, wherein:
in the single cycle, the first quantum processing region is configured to perform a first quantum logic gate operation that is different than a second quantum logic gate operation performed at the second quantum processing region in the single cycle.

14. The apparatus of claim 9, further comprising:
a quantum SIMD region controller configured to receive a quantum program that specifies which quantum processing regions perform which quantum operations in which cycles.

15. A non-transitory computer-readable medium storing instructions that, when executed by a processor, cause the processor to perform operations comprising:
moving a first qubit from a first quantum processing region to a second processing region, wherein moving the first qubit is performed in response to: (i) in a first cycle, the first quantum processing operation not using the first qubit; (ii) in a second cycle subsequent to the first cycle, a second quantum processing operation performed in the second processing region using the first qubit; and (iii) between the first cycle and the second cycle, no quantum operations being performed in the second quantum processing region; and moving a second qubit from a third quantum processing region to global memory, wherein moving the second qubit is performed in response to: (i) in a third cycle, a second qubit being used by a third quantum operation in a third quantum processing region; (ii) in a fourth cycle later than the third cycle, a fourth quantum operation using the second qubit in a fourth quantum processing region; and (iii) between the third cycle and the fourth cycle, a fifth quantum operation that does not use the second qubit being performed in the fourth quantum processing region.

16. The non-transitory computer-readable medium of claim 15, wherein the first quantum operation and the second quantum operation are quantum logic gate operations.

17. The non-transitory computer-readable medium of claim 15, wherein:
the first quantum operation and the second quantum operation are quantum single instruction multiple data ("SIMD") operations; and
the first quantum processing region and the second quantum processing regions are SIMD processing regions.

18. The non-transitory computer-readable medium of claim 17, wherein in in a single cycle, the first quantum processing region performs the same quantum logic operation on one or more qubits in the first quantum processing region.

19. The non-transitory computer-readable medium of claim 18, wherein in the single cycle, the first quantum processing region performs a first quantum logic gate operation that is different than a second quantum logic gate operation performed at the second quantum processing region in the single cycle.

20. The non-transitory computer-readable medium of claim 15, wherein the instructions are further configured to cause the processor to:
in a transformed quantum program, insert instructions that comprise quantum operations specified by an intermediate quantum program that are reordered to convert non-consecutive uses of a single qubit into consecutive uses of the single qubit.

21. The non-transitory computer-readable medium of claim 15, wherein the operations further comprise receiving a quantum program that specifies which quantum processing regions perform which quantum operations in which cycles.

* * * * *